United States Patent
Lety

(10) Patent No.: US 12,549,560 B2
(45) Date of Patent: *Feb. 10, 2026

(54) SYSTEMS AND METHODS FOR MULTI-LEVEL SEGMENTED ZTNA ACCESS CONTROL

(71) Applicant: Fortinet, Inc., Sunnyvale, CA (US)

(72) Inventor: Emmanuel Lety, Sophia-Antipolis (FR)

(73) Assignee: Fortinet, Inc., Sunnyvale, CA (US)

(*) Notice: Subject to any disclaimer, the term of this patent is extended or adjusted under 35 U.S.C. 154(b) by 158 days.

This patent is subject to a terminal disclaimer.

(21) Appl. No.: 18/208,115

(22) Filed: Jun. 9, 2023

(65) Prior Publication Data
US 2024/0414168 A1    Dec. 12, 2024

(51) Int. Cl.
*H04L 29/00* (2006.01)
*H04L 9/40* (2022.01)

(52) U.S. Cl.
CPC ........ *H04L 63/105* (2013.01); *H04L 63/0823* (2013.01); *H04L 63/20* (2013.01)

(58) Field of Classification Search
CPC .. H04L 63/20; H04L 63/0281; H04L 63/0823
See application file for complete search history.

(56) References Cited

U.S. PATENT DOCUMENTS

| | | | |
|---|---|---|---|
| 2022/0345491 A1* | 10/2022 | Luo | H04L 63/20 |
| 2023/0038058 A1* | 2/2023 | May | H04L 63/0823 |
| 2024/0414201 A1 | 12/2024 | Lety | |

* cited by examiner

*Primary Examiner* — Jeffrey C Pwu
*Assistant Examiner* — Helai Salehi
(74) *Attorney, Agent, or Firm* — Jaffery Watson Hamilton & DeSanctis LLP

(57) ABSTRACT

Various embodiments provide systems and methods for applying ZTNA control in a multi-level, segmented network environment.

19 Claims, 7 Drawing Sheets

SYSTEMS AND METHODS FOR MULTI-LEVEL SEGMENTED ZTNA ACCESS CONTROL

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright @ 2023, Fortinet, Inc.

FIELD

Embodiments discussed generally relate to systems and methods for authenticating network access, and more particularly to systems and methods for applying ZTNA control in a multi-level, segmented network environment.

BACKGROUND

It is typical for a firewall to control access to a secure network based upon, for example, zero trust network access ("ZTNA") processes. Such ZTNA processes include an endpoint device communicating with an endpoint management system ("EMS") where the endpoint device presents various attributes of the endpoint device, and in exchange receives a ZTNA certificate. This ZTNA certificate is provided by the endpoint device to a firewall governing access to a secure network, and the firewall uses this ZTNA certificate to determine whether to grant access to the endpoint device. Such an approach does not provide for multi-level, segmented firewall implementations.

Accordingly, there is a need in the art for advanced systems and methods for performing ZTNA processing in networks employing multi-level level, segmented firewall implementations.

SUMMARY

Various embodiments provide systems and methods for applying ZTNA control in a multi-level, segmented network environment.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
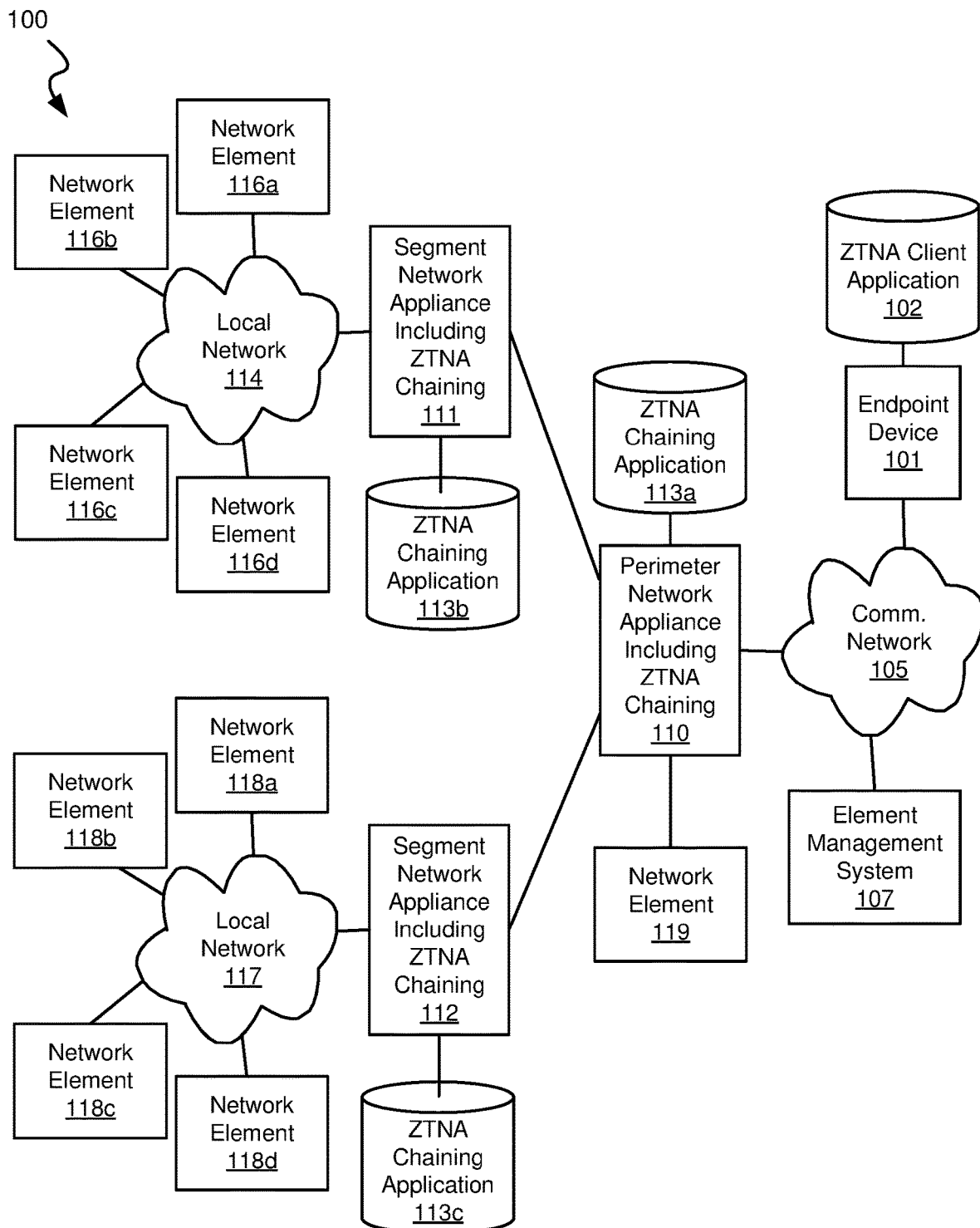
FIGS. 1A-1C illustrate a network architecture including both a perimeter network appliance and segment network appliances each configured to perform ZTNA chaining in accordance with some embodiments.

Various embodiments provide systems and methods for applying ZTNA control in a multi-level, segmented network environment. Such embodiments are performed in networks that open tens or more network sessions per second, and as such applying the ZTNA control is performed at speeds at speeds that allow for opening tens or more or more network sessions per second.

It has been found that network environments are being developed with a perimeter network security appliance that performs a network access determination for a first defined level of network access, and one or more layers of segment network security appliances that perform network access determination for a second defined level of network access. Such an approach allows for segments of a network secured by a perimeter network security appliance to apply differing levels of network security for accesses to a respective subset or segment of the network where the respective segments of the network are protected by one or more levels of segment network security appliances.

As ZTNA control is traditionally performed at the periphery of a network, a standard ZTNA control will be completed at the perimeter network security appliance. This essentially renders the segment network security appliance useless where ZTNA is used as there is no mechanism for multi-layer ZTNA processing. As such, in a multi-level, segmented network only the perimeter network security appliance has any control over access, effectively rendering a segment network security appliance mere surplus.

Embodiments discussed herein provide systems and methods that allow for receiving a ZTNA request from an endpoint device at the perimeter network security appliance, and for applying different levels of ZTNA access control by a combination of the perimeter network security appliance and one or more segment network security appliances using the same ZTNA request. Accordingly, as just one of many advantages, some embodiments discussed herein allow for the advantages of a multi-level, segmented network environment even where ZTNA access control is implemented.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided, at least in part, as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance, network element, or network device may include and/or operate as a network processor. In some cases, network appliance, network element, or network device may be a network router, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Yet other devices may include a general-purpose computer coupled to custom hardware. Based upon the disclosure provided herein, one of ordinary skill in the art will recognize a variety of network appliances that may be used in relation to different embodiments. In some cases, a network appliance may be a "network security appliance" or a "network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBAL-ANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances). A "perimeter network appliance" is a network appliance deployed at a perimeter of a secured network and as such can perform processing for a defined set of network accesses, and a "segment network appliance" is a security appliance deployed within the perimeter of the secured network such that it performs processing for only a subset of the defined set of network accesses. The perimeter network appliance may be a perimeter network security appliance, and the segment network appliance may be a segment network security appliance.

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for performing zero trust network access control in a multi-level, segmented network environment. Such methods include: receiving, by a first network appliance, a first ZTNA request, where the first ZTNA request is received in-line with communication traffic, and where the first ZTNA request includes: a ZTNA certificate authenticating an endpoint device, and identification of a network element to be accessed; receiving from an endpoint management system, by the first network appliance, ZTNA tags corresponding to the ZTNA certificate; applying, by the first network appliance, a security policy to the ZTNA tags to yield an authorization; determining, by the first network appliance, that the network element to be accessed is controlled by a second network appliance; and generating, by the first network appliance, a second ZTNA request, wherein the second ZTNA request includes: the communication traffic and the ZTNA tags. In some cases, the communication traffic is Transmission Control Protocol/Internet Protocol traffic.

In some instances of the aforementioned embodiments, the methods further include communicating, by the first network appliance, the second ZTNA request to the second network appliance. In various instances of the aforementioned embodiments, the second ZTNA request is encapsulated in a ZTNA access proxy tunnel (which may also be referred to herein as a Transmission Control Protocol (TCP) forwarding access proxy (TFAP) tunnel). In some instances of the aforementioned embodiments, the second network appliance is a segment network appliance. In some such instances, the first network appliance is a perimeter network appliance. In other such instances where the segment network appliance is a second segment network appliance, the first network appliance is a first segment network appliance.

In various instances of the aforementioned embodiments where the authorization is a first authorization and the security policy is a first security policy, the methods further include applying, by the second network appliance, a second security policy to the ZTNA tags to yield a second authorization, where the second security policy is different from the first security policy. In some such instances, the first security policy corresponds to two or more segments of the multi-level, segmented network environment, and the second security policy corresponds to only a single segment of the multi-level, segmented network environment. In various such instances, the methods further include: determining, by the second network appliance, that the network element to be accessed is controlled by a third network appliance; generating, by the second network appliance, a third ZTNA request, wherein the third ZTNA request includes: the communication traffic and the ZTNA tags; and communicating, by the second network appliance, the third ZTNA request to the third network appliance.

Yet other embodiments provide systems for performing zero trust network access control in a multi-level, segmented network environment. Such systems include a first network appliance controlling access to a set of network elements. The first network appliance includes: a first processor and a first non-transitory computer readable medium. The first non-transitory computer readable medium has stored therein instructions that when executed by the first processor cause the first processor to: receive a first ZTNA request, where the first ZTNA request is received in-line with communication traffic, and where the first ZTNA request includes: a ZTNA certificate authenticating an endpoint device, and identification of a network element to be accessed; receive ZTNA tags corresponding to the ZTNA certificate from an endpoint management system; apply a security policy using the ZTNA tags to yield an authorization; determine that the network element to be accessed is controlled by a second network appliance; generate a second ZTNA request, wherein the second ZTNA request includes the communication traffic and the ZTNA tags; and communicate the second ZTNA request to a second network appliance, wherein the second network appliance controls access to a subset of the set of network elements.

Yet further embodiments provide non-transitory computer readable media having stored therein instructions that when executed by a processor cause the processor to: receive a first ZTNA request, where the first ZTNA request is received in-line with communication traffic, and where the first ZTNA request includes: a ZTNA certificate authenticating an endpoint device, and identification of a network element to be accessed; receive ZTNA tags corresponding to the ZTNA certificate from an endpoint management system; apply a security policy using the ZTNA tags to yield an authorization; determine that the network element to be accessed is controlled by a second network appliance; generate a second ZTNA request, wherein the second ZTNA request includes: the communication traffic and the ZTNA tags; and communicate the second ZTNA request to a second network appliance, wherein the second network appliance controls access to a subset of the set of network elements.

Yet additional embodiments provide methods for performing zero trust network access control in a multi-level, segmented network environment. The methods include: receiving, by a first network appliance, a first ZTNA request, where the first ZTNA request is received in-line with communication traffic, and where the first ZTNA request includes a ZTNA certificate authenticating an endpoint device, and identification of a network element to be accessed; receiving from an endpoint management system, by the first network appliance, ZTNA tags corresponding to the ZTNA certificate; applying, by the first network appliance, a security policy to the ZTNA tags to yield an authorization; determining, by the first network appliance, that the network element to be accessed is controlled by a second network appliance; and generating, by the first network appliance, a second ZTNA request, wherein the second ZTNA request includes: the communication traffic and the ZTNA certificate. In some instances of the aforementioned embodiments, the methods further include communicating, by the first network appliance, the second ZTNA request to the second network appliance.

In some instances of the aforementioned embodiments where the authorization is a first authorization and the security policy is a first security policy, the methods further include: requesting from an endpoint management system, by the second network appliance, ZTNA tags corresponding to the ZTNA certificate; receiving, by the second network appliance, ZTNA tags corresponding to the ZTNA certificate; and applying, by the second network appliance, a second security policy to the ZTNA tags to yield a second authorization, wherein the second security policy is different from the first security policy. In some such instances, the methods further include, determining, by the second network appliance, that the network element to be accessed is controlled by a third network appliance; generating, by the second network appliance, a third ZTNA request, wherein the third ZTNA request includes: the communication traffic and the ZTNA tags; and communicating, by the second network appliance, the third ZTNA request to the third network appliance.

Yet further embodiments provide systems for performing zero trust network access control in a multi-level, segmented network environment. The systems include a first network appliance controlling access to a set of network elements. The first network appliance includes: a first processor and a first non-transitory computer readable medium that has stored therein instructions that when executed by the first processor cause the first processor to: receive a first ZTNA request, where the first ZTNA request is received in-line with communication traffic, and where the first ZTNA request includes: a ZTNA certificate authenticating an endpoint device, and identification of a network element to be accessed; receive ZTNA tags corresponding to the ZTNA certificate from an endpoint management system; apply a security policy using the ZTNA tags to yield an authorization; determine that the network element to be accessed is controlled by a second network appliance; generate a second ZTNA request, wherein the second ZTNA request includes: the communication traffic and the ZTNA certificate; and communicate the second ZTNA request to a second network appliance, wherein the second network appliance controls access to a subset of the set of network elements.

Yet additional embodiments provide non-transitory computer readable media having stored therein instructions that when executed by a processor cause the processor to: receive a first ZTNA request, where the first ZTNA request is received in-line with communication traffic, and where the first ZTNA request includes: a ZTNA certificate authenticating an endpoint device, and identification of a network element to be accessed; request ZTNA tags corresponding to the ZTNA certificate from an endpoint management system; receive ZTNA tags corresponding to the ZTNA certificate from the endpoint management system; apply a first security policy to the ZTNA tags to yield a first authorization; determine that the network element to be accessed is controlled by a second network appliance; generate a second ZTNA request, wherein the second ZTNA request includes: the communication traffic and the ZTNA certificate; communicate the second ZTNA request to a second network appliance, wherein the second network appliance controls access to a subset of the set of network elements; and apply a second security policy to the ZTNA tags to yield a second authorization, wherein the second security policy is different from the first security policy.

Turning to FIG. 1A, network architecture 100 is shown that includes a perimeter network appliance 110 and two segment network appliances 111, 112 in accordance with some embodiments. Each of perimeter network appliance 110 and segment network appliances 111, 112 is configured to execute a ZTNA chaining application 113 (i.e., a respective one of a ZTNA chaining application 113A, a ZTNA chaining application 113B, or a ZTNA chaining application 113C). Perimeter network appliance 110 controls access to all network elements (i.e., a network element 116a, a network element 116b, a network element 116c, a network element 116d, a network element 118a, a network element 118b, a network element 118c, a network element 118d, and a network element 119). In contrast, segment network appliance 111 controls access only to network element 116a, network element 116b, network element 116c, and network element 116d via a local network 114; and segment network appliance 112 controls access only to network element 118a, network element 118b, network element 118c, and network element 118d via a local network 117. Access to network element 119 does not require authorization from a segment network appliance. The aforementioned network elements may be any server, device, service, application, or the like that may be accessed via a network.

Local network 114 and local network 117 may respectively be any type of communication network known in the art. Those skilled in the art will appreciate that, local network 114 and/or local network 117 can be wireless network, a wired network, or a combination thereof that can be implemented as one of the various types of networks, such as an Intranet, a Local Area Network (LAN), a Wide Area Network (WAN), an Internet, and the like. Further, local network 114 and/or local network 117 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

In operation, an endpoint device 101 executing a ZTNA client application 102 communicates with an element management system 107 via a communication network 105. Communication network 105 can be wireless network, a wired network, or a combination thereof that can be implemented as one of the various types of networks, such as an Intranet, a Local Area Network (LAN), a Wide Area Network (WAN), an Internet, and the like. In particular, endpoint device 101 executing a ZTNA client application 102 provides a variety of telemetry about endpoint device 101 to element management system 107. This telemetry includes various information that may be used to define the security posture of endpoint device 101 including, but not limited to, versions of applications included on endpoint device 101, malware detection software and version thereof included on endpoint device 101, the hardware and hardware configuration of endpoint device 101, and the like. Based upon the disclosure provide herein, one of ordinary skill in the art will recognize a variety of telemetry that may be provided from endpoint device 101 to endpoint management system 107 in accordance with different embodiments.

In turn, endpoint management system 107 generates one or more ZTNA tags that are each respective elements of the device posture of endpoint device 101. Such ZTNA tags represent the security posture of the endpoint device with which they are associated. In addition, endpoint management system 107 creates a ZTNA certificate that includes a unique identifier that can be used to access the aforementioned ZTNA tags. This ZTNA certificate is sent to ZTNA client application 102. In some embodiments, for endpoint devices outside of the network (i.e., remote users), the ZTNA tags includes a list of ZTNA device certificates of the endpoint devices matching a specific device criterion associated with the ZTNA Tag (e.g., "the endpoint device is running an Anti-Virus"). If the ZTNA device certificate sent inside the ZTNA tunnel, is part of the ZTNA Tag(s) used in the ZTNA policy, then access will be granted. Thus, such ZTNA tags can be used to verify for each new session that the endpoint device has the required level of security posture to access a requested network element (e.g., a network accessible application).

Endpoint device 101 executing a ZTNA client application 102 can request access to a network element governed by perimeter network appliance 110 by using a standard ZTNA approach (e.g., one of network element 116a, network element 116b, network element 116c, network element 116d, network element 118a, network element 118b, network element 118c, network element 118d, or network element 119) via a communication network 105.

Communication network 105 may be any type of communication network known in the art. Those skilled in the art will appreciate that, communication network 105 can be wireless network, a wired network, or a combination thereof that can be implemented as one of the various types of networks, such as an Intranet, a Local Area Network (LAN), a Wide Area Network (WAN), an Internet, and the like. The ZTNA request from endpoint device 101 is encapsulated with the aforementioned ZTNA certificate.

Perimeter network appliance 110 receives the ZTNA request from endpoint device 101 and processes the request to extract the ZTNA certificate. In turn, perimeter network appliance 110 communicates the ZTNA certificate to element management system 107, and based upon the ZTNA certificate perimeter network appliance 110 receives the corresponding ZTNA tags from element management system 107. Perimeter network appliance 110 applies a first defined set of network policies to the request from the endpoint device 101 using the received ZTNA tags. A determination is made based upon application of the first defined set of network policies about granting access to endpoint device 101.

In addition, where access is granted by perimeter network appliance 110, perimeter network appliance 110 determines if the network element that is the subject of the request from endpoint device 101 is protected by a segment network appliance (e.g., one of segment network appliance 111 or network segment appliance 112). Where the network element is not protected by a segment network appliance (e.g., network element 119), a tunnel is setup between the network element that is the subject of the request and endpoint device 101.

Alternatively, where the network element is protected by a segment network appliance (e.g., one of network element 116a, network element 116b, network element 116c, network element 116d, network element 118a, network element 118b, network element 118c, or network element 118d), perimeter network appliance 110 identifies the relevant segment network appliance and generates a chained ZTNA request that is transmitted to the relevant segment network appliance. The chaining includes transmitting either the ZTNA tags received by perimeter network appliance 110 from element management system 107 or the ZTNA certificate received from endpoint device 101. The ZTNA tags or ZTNA certificate are provided in-line (i.e., encapsulated in a ZTNA access proxy tunnel) with the network traffic passing from perimeter network appliance 110 to the relevant segment network appliance. By transmitting the aforementioned ZTNA information in-line with the traffic helps preserve the session-based nature of ZTNA.

For the approach where the ZTNA tags are transmitted from perimeter network appliance 110 to the relevant segment network appliance encapsulated in a ZTNA access proxy tunnel, the relevant segment network appliance is enabled to directly learn the device posture from ZTNA tags carried inside the TFAP tunnel. Alternatively, for the approach where the ZTNA certificate is transmitted from perimeter network appliance 110 to the relevant segment network appliance encapsulated in a ZTNA access proxy tunnel, the relevant segment network appliance is enabled to indirectly learn the device posture by providing the ZTNA certificate to element management system 107, and receiving the ZTNA tags in return.

Using the ZTNA tags, the relevant segment network appliance applies a second defined set of network policies to the request from the endpoint device 101 using the received ZTNA tags. A determination is made based upon application of the second defined set of network policies about granting access to endpoint device 101. The first defined set of network policies may be general and apply to all accesses to the network, and the second defined set of network policies may be specific to elements protected by the relevant segment network appliance. As such, a single ZTNA request can be used to perform multi-level access control to different segments of a network. In some embodiments, endpoint device 101 is not aware of this multi-level access control.

While network architecture 100 is shown as including either perimeter network appliance 110, a combination of perimeter network appliance 110 and segment network appliance 111, or a combination of perimeter network appliance 110 and segment network appliance 112 protecting respective sets of network elements, other configurations are possible in accordance with different embodiments. Such other configurations may include, but are not limited to, a perimeter network appliance, a first layer segment network appliance, and a second layer segment network appliance. Based upon the disclosure provided herein, one of ordinary skill in the art will recognize a variety of configurations that are possible in accordance with different embodiments.

Figure 1B:
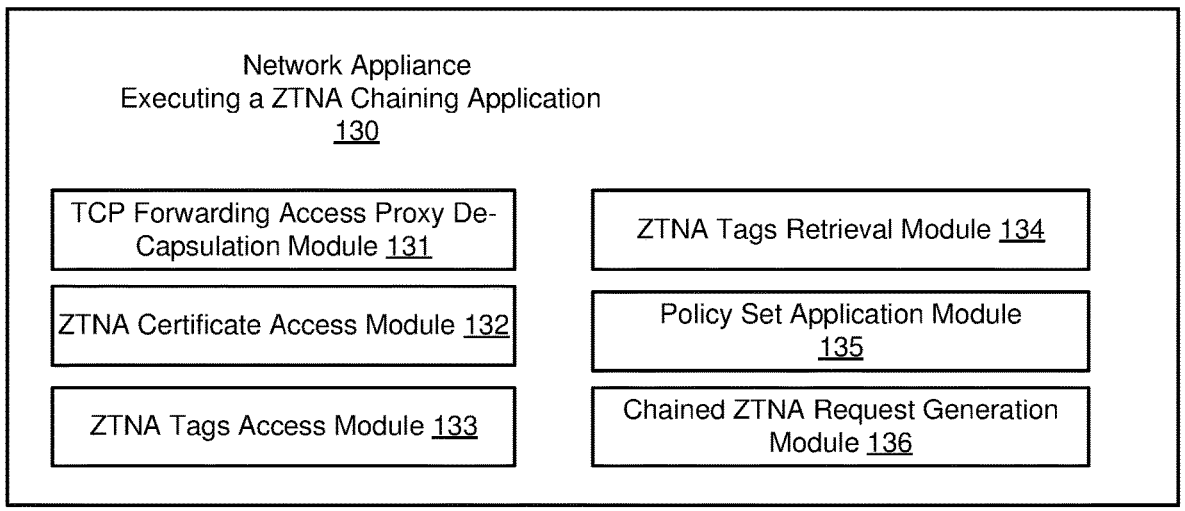

Turning to FIG. 1B, an example implementation of a network appliance executing a ZTNA chaining application 130 (e.g., and of perimeter network appliance 110 executing ZTNA chaining application 113a, segment network appliance 111 executing ZTNA chaining application 113b, or segment network appliance 112 executing ZTNA chaining application 113c) is shown in accordance with some embodiments. As shown in this example, network appliance executing a ZTNA chaining application 130 includes: a ZTNA access proxy de-capsulation module 131, a ZTNA certificate access module 132, a ZTNA tags access module 133, a ZTNA tags retrieval module 135, a policy set application module 134, and a chained ZTNA request generation module 135.

ZTNA access proxy de-capsulation module 131 is configured to de-capsulate a ZTNA access proxy tunnel. In some cases, the de-capsulated ZTNA access proxy includes a ZTNA certificate or ZTNA tags. Where such is the case, ZTNA access proxy De-Capsulation Module 131 flags the received data as a ZTNA request such that ZTNA processing is triggered.

ZTNA certificate access module 132 is configured to access a ZTNA certificate from a received ZTNA request that includes such a certificate. ZTNA tags access module 133 is configured to access ZTNA tags from a received ZTNA request that include such tags.

ZTNA tags retrieval module 134 is configured to communicate a ZTNA certificate to an endpoint management system, and to receive ZTNA tags corresponding to the ZTNA certificate. Policy set application module 135 is configured to apply network security policies to ZTNA tags to determine whether a requesting endpoint device is authorized to access the network or segment thereof controlled by the network appliance applying the control.

Chained ZTNA request generation module 136 is configured to, depending upon the embodiment, incorporate either a ZTNA certificate or ZTNA tags in-line with TCP traffic. In some embodiments, such incorporation is done by encapsulating TCP traffic with one of a ZTNA certificate or ZTNA tags to yield a chained ZTNA request. The encapsulation may appear as a ZTNA access proxy tunnel.

Figure 1C:
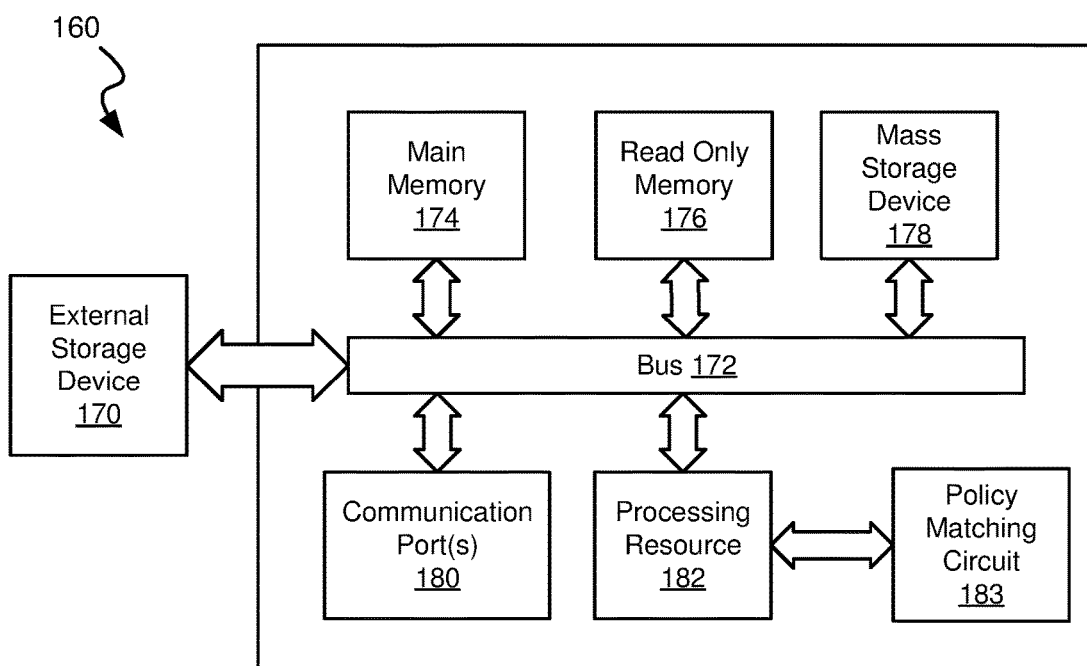

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1. AMD Ryzen, or AMD® Opteron® or Athlon MP® processor(s), Motorola® lines of processors, FortiSOC™ system on chip processors or other future processors. Processors 182 may include various modules associated with embodiments of the present disclosure. Processor 182 may communicate with a policy matching circuit 183. Policy matching circuit 183 includes a number of comparators that can be configured to apply a received network packet to a non-equal boundary policy set search tree to identify one or more policies from a network policy set that are to be applied to the network packet.

Communication port 180 can be any of an RS-232 port for use with a modem-based dialup connection, a 10/100 Ethernet port, a Gigabit, 10 Gigabit, 25 G, 40 G, and 100 G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Perimeter Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
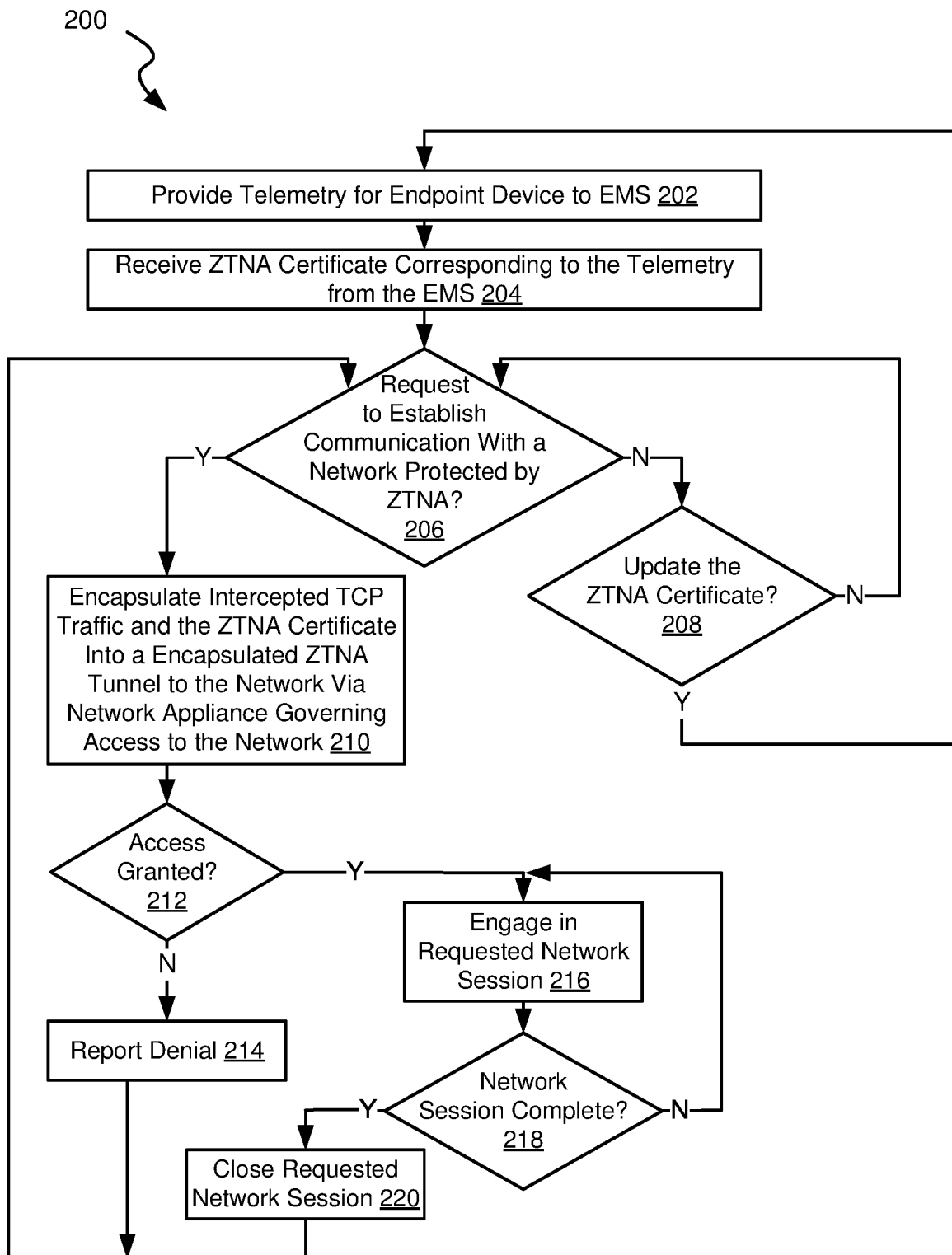
FIG. 2 is a flow diagram showing a method in accordance with some embodiments for ZTNA access to a multi-level, segmented network from the perspective of an accessing endpoint device.

Turning to FIG. 2, a flow diagram 200 shows a method in accordance with some embodiments for ZTNA access to a multi-level, segmented network from the perspective of an accessing endpoint device. Following flow diagram 200, the accessing endpoint device provides telemetry information to an endpoint management system 202. Such telemetry information includes various information that may be used to define the security posture of the accessing endpoint device including, but not limited to, versions of applications included on the endpoint device, malware detection software and version thereof included on the endpoint device, the hardware and hardware configuration of the endpoint device, and the like. Based upon the disclosure provide herein, one of ordinary skill in the art will recognize a variety of telemetry information that may be provided from the endpoint device to the endpoint management system in accordance with different embodiments.

In response to providing the telemetry information (block 202), the endpoint device receives a ZTNA certificate corresponding to the telemetry from the endpoint management system (block 204). The endpoint management system generates one or more ZTNA tags that are each respective elements of the device posture of the endpoint device. In addition, the endpoint management system creates the aforementioned ZTNA certificate that includes a unique identifier that can be used to access the aforementioned ZTNA tags. The endpoint management system communicates this ZTNA certificate to the endpoint device.

A ZTNA client running on the endpoint device determines whether there is a request to access a network protected by ZTNA (block 206). Such a determination is made by watching TCP traffic sent from the endpoint device, and determining whether the traffic is directed to a network protected by ZTNA. Where the ZTNA client identifies TCP traffic that is destined for a ZTNA protected network element (i.e., a request to establish communication with a network protected by ZTNA) (block 206), the ZTNA client transparently intercepts the outgoing TCP traffic towards the ZTNA protected network element, and encapsulates this traffic along with the ZTNA certificate as a ZTNA tunnel (block 210). This encapsulated TCP traffic and ZTNA certificate is sent to the perimeter network appliance controlling access to the network element that is the subject of the request. The TCP traffic may originate, for example, from another application executing on the endpoint device.

Where access to the network is not granted (block 212), the denial is reported by the ZTNA client (block 214). Alternatively, where access to the network is granted (block 212), a tunnel for the requested network access is opened and the endpoint device engages in the requested network session using the established tunnel (block 216). The network session continues to its completion (block 218) at which time the established tunnel is closed and the network session ends (block 220). Any process known in the art for establishing and closing a tunnel for a ZTNA communication session may be used.

Alternatively, where a request to access a network has not been received (block 206), the ZTNA client running on the endpoint device determines whether it is time to update the previously obtained ZTNA certificate (block 208). In some embodiments, the ZTNA client monitors changes made to the endpoint device (e.g., installation of an application, or an update to an application), and whenever a change is made the ZTNA client causes a request to update the ZTNA certificate to be made. Based upon the disclosure provided herein, one of ordinary skill in the art will recognize a variety of conditions that may be used to trigger an update of the ZTNA certificate for an endpoint device in accordance with different embodiments. Where it is determined that it is time to update the previously obtained ZTNA certificate (block 208), the processes of blocks 202-204 are repeated.

Figure 3:
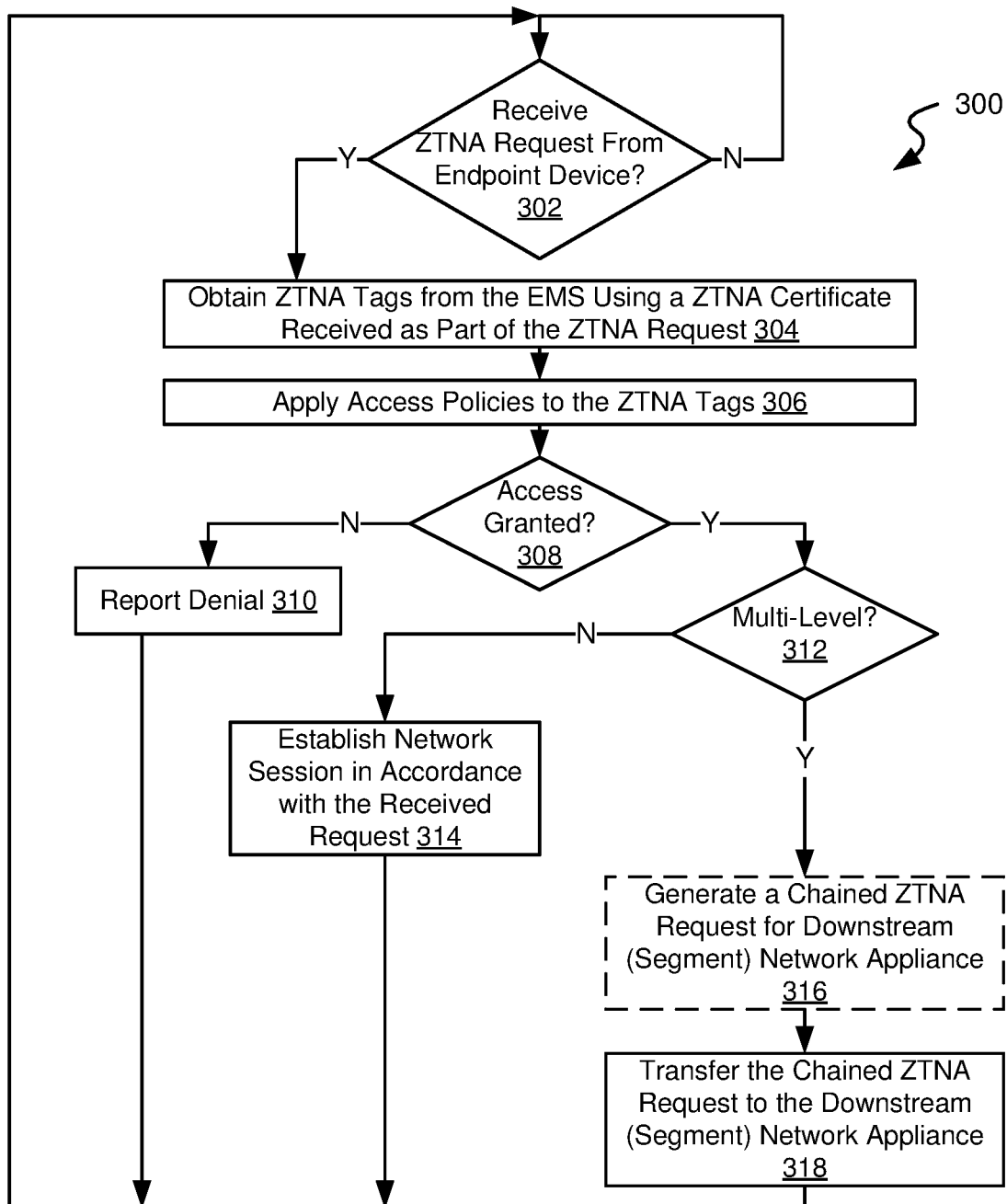
FIG. 3 is a flow diagram showing a method in accordance with some embodiments for processing a ZTNA request from an endpoint device where the request is to access a resource in a multi-level, segmented network from the perspective of a perimeter network security appliance.

Turning to FIG. 3, a flow diagram 300 shows a method in accordance with some embodiments for processing a ZTNA request from an endpoint device where the request is to access a resource in a multi-level, segmented network from the perspective of a perimeter network security appliance. Following flow diagram 300, a perimeter network appliance determines whether a ZTNA request has been received from an endpoint device (block 302). Determining that a ZTNA request has been received involves de-capsulating a received transmission. Where the received transmission is a ZTNA access proxy tunnel, it is de-capsulated. When the de-capsulated ZTNA access proxy tunnel includes a ZTNA certificate in-line with TCP traffic, it is determined that a ZTNA request has been received. Alternatively, when the de-capsulated ZTNA access proxy tunnel includes only TCP traffic, it is determined that a ZTNA request has not been received.

Where a ZTNA request has been received (block 302), the perimeter network appliance provides the received ZTNA certificate to an element management system as part of a request to obtain the ZTNA tags identified by the ZTNA certificate (block 304). Once the perimeter network appliance receives the ZTNA tags (block 304), the perimeter network appliance applies network access policies to the ZTNA tags to determine if the security posture of the endpoint device qualifies for access to the network controlled by the perimeter network appliance (block 306). In some embodiments, the aforementioned access policies are configured for the perimeter of the network, and are distinct from access policies applied by one or more segment network appliances.

Where application of the ZTNA tags to the access policies does not qualify the endpoint device for access to the network controlled by the perimeter network appliance (block 308), the denial is reported by the perimeter network appliance to the endpoint device (block 310). Alternatively, where application of the ZTNA tags to the access policies qualify the endpoint device for access to the network controlled by the perimeter network appliance (i.e., the endpoint device has been authenticated by the perimeter network appliance) (block 308), access to the network is granted by the perimeter network appliance. This is where ZTNA processing would normally terminate as the perimeter network appliance would forward the de-capsulated TCP traffic to the network element identified in the ZTNA request. This would, however, result in a failure to properly authenticate with a downstream (i.e., segment) network appliance causing the requested network transaction to be declined.

In contrast to this standard processing, the perimeter network appliance determines whether the network element identified in the ZTNA request is behind a segment network appliance (i.e., is a multi-level authorization required) (block 312). This is determined through use of network topology information available to the perimeter network appliance which identifies the logical locations of network elements relative to segment network appliances.

Where the network element that is the subject of the request is not behind a segment network appliance (block 312), a tunnel for the requested network access is opened between the endpoint device and the network element that is the subject of the ZTNA request, and the endpoint device engages in the requested network session using the established tunnel (block 314). The network session continues to its completion at which time the established tunnel is closed and the network session ends. Any process known in the art for establishing and closing a tunnel for a ZTNA communication session may be used.

Alternatively, where the network element that is the subject of the request is behind a segment network appliance (block 312), a chained ZTNA request is generated for a downstream (i.e., a segment) network appliance (block 316). Block 316 is shown in dashed lines as it may be done in one of two different ways that are more fully discussed below in relation to FIGS. 4A-4B.

The chained ZTNA request is transferred to the downstream (i.e., segment) network appliance (block 318). In turn, the downstream (i.e., segment) network appliance performs ZTNA authorization, and where appropriate grants access to the segment of the network controlled by the downstream (i.e., segment) network appliance.

Figure 4A:
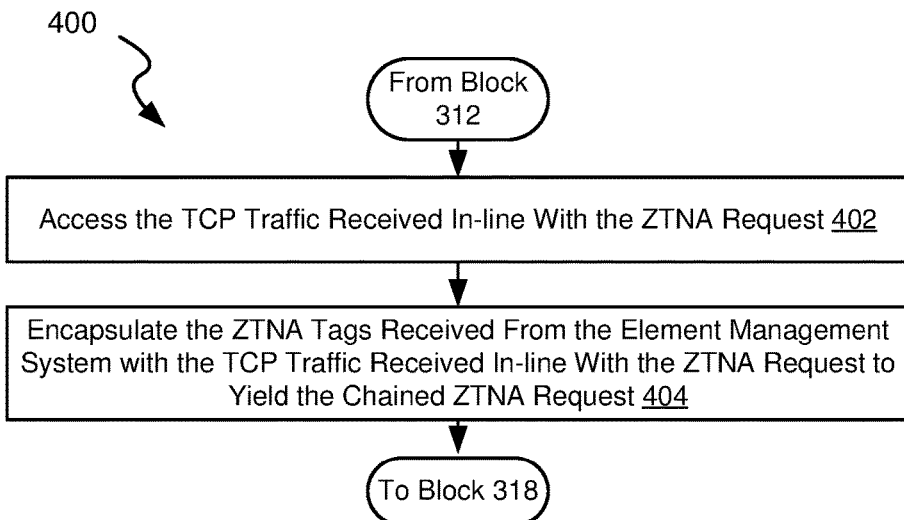
FIGS. 4A-4B each show a respective approach for processing ZTNA requests in a multi-level, segmented network in accordance with different embodiments.

Turning to FIG. 4A, a flow diagram 400 shows a method for generating the chained ZTNA request discussed above in relation to block 316 that may be used in relation to some embodiments. Following flow diagram 400, the TCP traffic that was received as part of the ZTNA request received by the currently processing network appliance (either a peripheral network appliance or a segment network appliance) is accessed (block 402). This TCP traffic is encapsulated with the ZTNA tags that were received from the element management system to yield a chained ZTNA request (block 404). In some embodiments, the chained ZTNA request may be in the form of a ZTNA access proxy that has the ZTNA tags incorporated in-line with the TCP traffic.

Figure 4B:
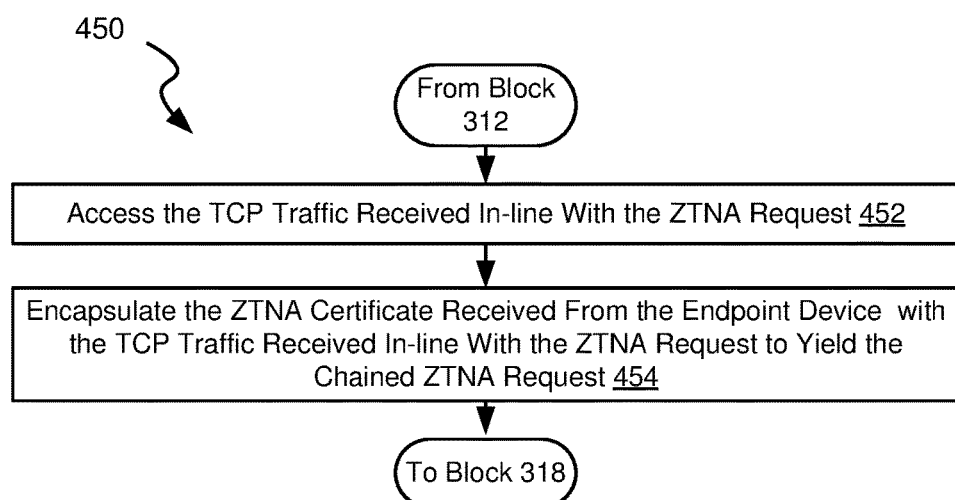

Turning to FIG. 4B, a flow diagram 450 shows another method for generating the chained ZTNA request discussed above in relation to block 316 that may be used in relation to other embodiments. Following flow diagram 450, the TCP traffic that was received as part of the ZTNA request received by the currently processing network appliance (either a peripheral network appliance or a segment network appliance) is accessed (block 452). This TCP traffic is encapsulated with the ZTNA certificate that was received from the endpoint device to yield a chained ZTNA request (block 454). In some embodiments, the chained ZTNA request may be in the form of a ZTNA access proxy that has the ZTNA tags incorporated in-line with the TCP traffic.

Figure 5A:
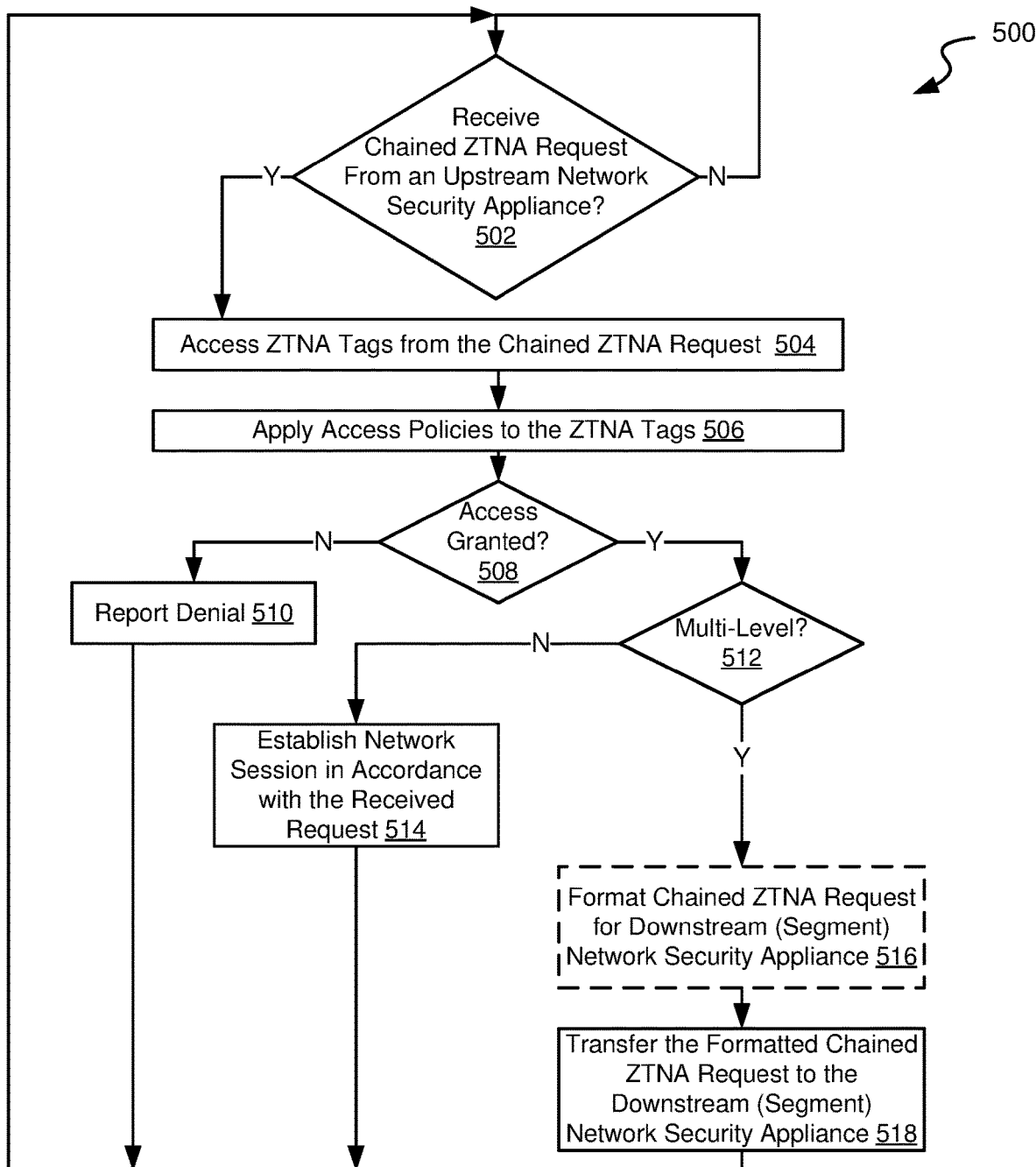
FIGS. 5A-5B each show a respective methods in accordance with different embodiments for processing a chained ZTNA request from either a perimeter network appliance or another segment network appliance.

Turning to FIG. 5A, a flow diagram 500 shows a method in accordance with some embodiments for processing a chained ZTNA request from either a perimeter network appliance or another segment network appliance. The method of for diagram 500 is tailored for use in embodiments described in relation to FIG. 4A above where ZTNA tags are transferred as part of a chained ZTNA request. Following flow diagram 500, a segment network appliance determines whether a ZTNA request has been received from an upstream (i.e., either perimeter or another segment) network appliance (block 502). Determining that a chained ZTNA request has been received involves de-capsulating a received transmission. Where the received transmission is a ZTNA access proxy tunnel, it is de-capsulated. When the de-capsulated ZTNA access proxy tunnel includes a ZTNA certificate in-line with TCP traffic, it is determined that a chained ZTNA request has been received. Alternatively, when the de-capsulated ZTNA access proxy tunnel includes only TCP traffic, it is determined that a chained ZTNA request has not been received.

Where a chained ZTNA request is received (block 502), the segment network appliance accesses the ZTNA tags from the de-capsulated chained ZTNA request (block 504). Once the segment network appliance has the ZTNA tags (block 504), the segment network appliance applies network access policies to the ZTNA tags to determine if the security posture of the endpoint device qualifies for access to the segment of the network controlled by the segment network appliance (block 506). In some embodiments, the aforementioned access policies are configured for the segment of the network controlled by the segment network appliance, and are distinct from access policies applied by one or more other segment network appliances or the a perimeter network appliance.

Where application of the ZTNA tags to the access policies does not qualify the endpoint device for access to the segment of the network controlled by the segment network appliance (block 508), a denial is reported by the segment network appliance to the endpoint device (block 510). Alternatively, where application of the ZTNA tags to the access policies qualify the endpoint device for access to the segment of the network controlled by the segment network appliance (i.e., the endpoint device has been authenticated by both the perimeter network appliance and the segment network appliance) (block 508), access to the segment of the network is granted by the segment network appliance.

The segment network appliance determines whether the network element identified in the chained ZTNA request is behind a segment network appliance (i.e., is an additional level of authorization required) (block 512). This is determined through use of network topology information available to the segment network appliance which identifies the logical locations of network elements relative to segment network appliances.

Where the network element that is the subject of the request is not behind another segment network appliance (block 512), a tunnel for the requested network access is opened between the endpoint device and the network element that is the subject of the chained ZTNA request, and the endpoint device engages in the requested network session using the established tunnel (block 514). The network session continues to its completion at which time the established tunnel is closed and the network session ends. Any process known in the art for establishing and closing a tunnel for a ZTNA communication session may be used.

Alternatively, where the network element that is the subject of the request is behind another segment network appliance (block 512), a chained ZTNA request is generated for a downstream (i.e., a segment) network appliance (block 516). Block 516 is shown in dashed lines as it may be done in one of two different ways that are more fully discussed below in relation to FIGS. 4A-4B.

The chained ZTNA request is transferred to the downstream (i.e., segment) network appliance (block 518). In turn, the downstream (i.e., segment) network appliance performs ZTNA authorization, and where appropriate grants access to the segment of the network controlled by the downstream (i.e., segment) network appliance.

Figure 5B:
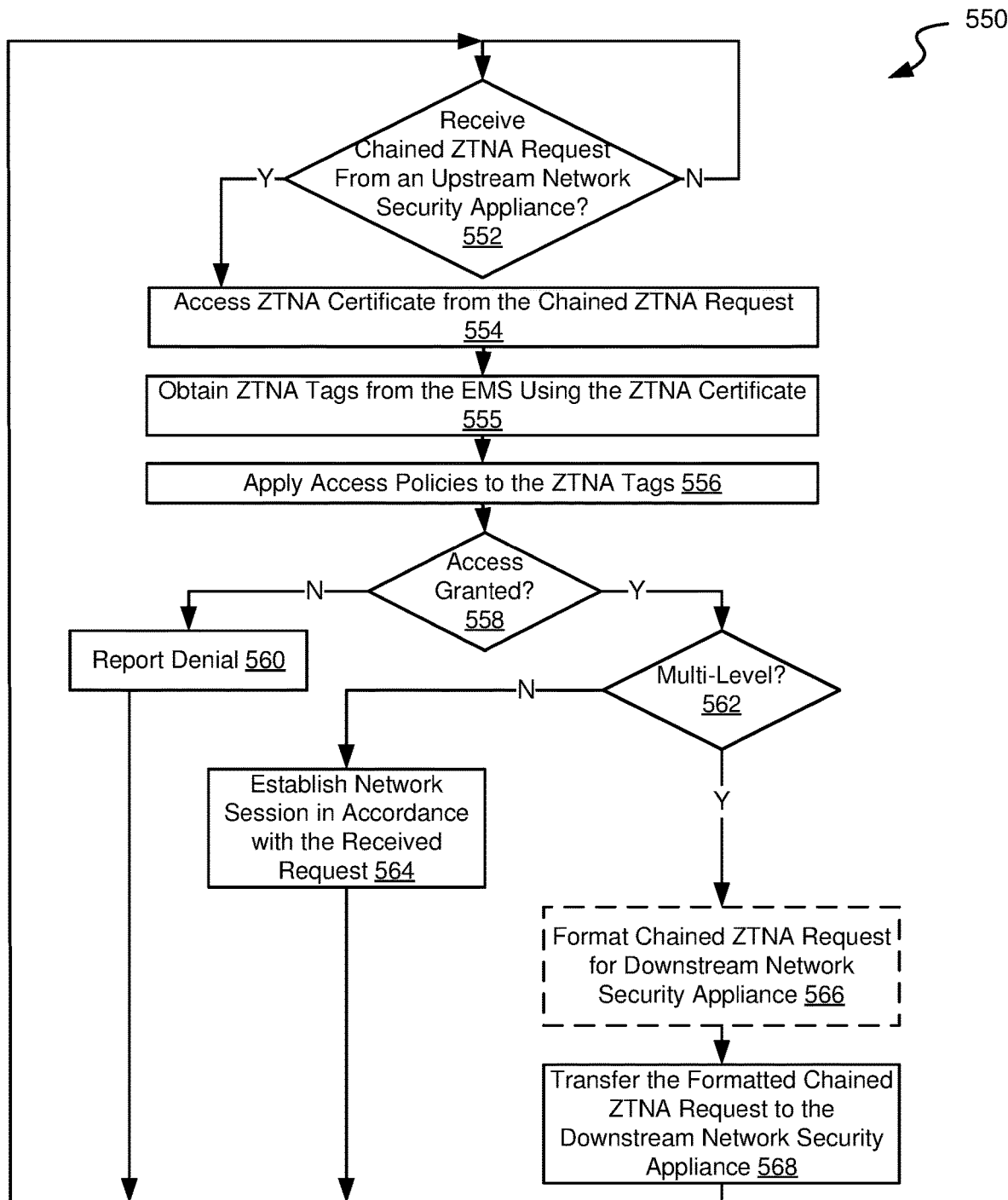

Turning to FIG. 5B, a flow diagram 550 shows a method in accordance with various embodiments for processing a chained ZTNA request from either a perimeter network appliance or another segment network appliance. The method of for diagram 550 is tailored for use in embodiments described in relation to FIG. 4B above where a ZTNA certificate is transferred as part of a chained ZTNA request. Following flow diagram 550, a segment network appliance determines whether a ZTNA request has been received from an upstream (i.e., either perimeter or another segment) network appliance (block 552). Determining that a chained ZTNA request has been received involves de-capsulating a received transmission. Where the received transmission is a ZTNA access proxy tunnel, it is de-capsulated. When the de-capsulated ZTNA access proxy tunnel includes a ZTNA certificate in-line with TCP traffic, it is determined that a chained ZTNA request has been received. Alternatively, when the de-capsulated ZTNA access proxy tunnel includes only TCP traffic, it is determined that a chained ZTNA request has not been received.

Where a chained ZTNA request is received (block 552), the segment network appliance accesses the ZTNA certificate from the de-capsulated chained ZTNA request (block 554). The segment network appliance provides the received ZTNA certificate to an element management system as part of a request to obtain the ZTNA tags identified by the ZTNA certificate (block 555). Once the segment network appliance receives the ZTNA tags (block 555), the segment network appliance applies network access policies to the ZTNA tags to determine if the security posture of the endpoint device qualifies for access to the segment of the network controlled by the segment network appliance (block 556). In some embodiments, the aforementioned access policies are configured for the segment of the network controlled by the segment network appliance, and are distinct from access policies applied by one or more other segment network appliances or the a perimeter network appliance.

Where application of the ZTNA tags to the access policies does not qualify the endpoint device for access to the segment of the network controlled by the segment network appliance (block 558), a denial is reported by the segment network appliance to the endpoint device (block 560). Alternatively, where application of the ZTNA tags to the access policies qualify the endpoint device for access to the segment of the network controlled by the segment network appliance (i.e., the endpoint device has been authenticated by both the perimeter network appliance and the segment network appliance) (block 558), access to the segment of the network is granted by the segment network appliance.

The segment network appliance determines whether the network element identified in the chained ZTNA request is behind a segment network appliance (i.e., is an additional level of authorization required) (block 562). This is determined through use of network topology information available to the segment network appliance which identifies the logical locations of network elements relative to segment network appliances.

Where the network element that is the subject of the request is not behind another segment network appliance (block 562), a tunnel for the requested network access is opened between the endpoint device and the network element that is the subject of the chained ZTNA request, and the endpoint device engages in the requested network session using the established tunnel (block 564). The network session continues to its completion at which time the established tunnel is closed and the network session ends. Any process known in the art for establishing and closing a tunnel for a ZTNA communication session may be used.

Alternatively, where the network element that is the subject of the request is behind another segment network appliance (block 562), a chained ZTNA request is generated for a downstream (i.e., a segment) network appliance (block 566). Block 566 is shown in dashed lines as it may be done in one of two different ways that are more fully discussed below in relation to FIGS. 4A-4B.

The chained ZTNA request is transferred to the downstream (i.e., segment) network appliance (block 568). In turn, the downstream (i.e., segment) network appliance performs ZTNA authorization, and where appropriate grants access to the segment of the network controlled by the downstream (i.e., segment) network appliance.

In conclusion, the present disclosure provides for novel systems, devices, and methods. While detailed descriptions of one or more embodiments have been given above, various alternatives, modifications, and equivalents will be apparent to those skilled in the art without varying from the spirit of the claims. Therefore, the above description should not be taken as limiting the scope of the inventions, which are defined by the appended claims.

What is claimed is:

1. A method for performing zero trust network access control in a multi-level, segmented network environment, the method comprising:
   receiving, by a first network appliance, a first Zero Trust Network Access (ZTNA) request, wherein the first ZTNA request is received in-line with communication traffic, and wherein the first ZTNA request includes: a ZTNA certificate authenticating an endpoint device, and identification of a network element to be accessed;
   receiving from an endpoint management system, by the first network appliance, ZTNA tags corresponding to the ZTNA certificate;
   applying, by the first network appliance, a security policy to the ZTNA tags to yield an authorization;
   determining, by the first network appliance, that the network element to be accessed is controlled by a second network appliance;
   generating, by the first network appliance, a second ZTNA request, wherein the second ZTNA request includes: the communication traffic and the ZTNA tags; and
   apply, by the second network appliance, a second security policy to the ZTNA tags to yield a second authorization, wherein the second security policy is different from the security policy.

2. The method of claim 1, the method further comprising:
   communicating, by the first network appliance, the second ZTNA request to the second network appliance.

3. The method of claim 1, wherein the second ZTNA request is encapsulated in a ZTNA access proxy tunnel.

4. The method of claim 1, wherein the second network appliance is a segment network appliance.

5. The method of claim 1, wherein the authorization is a first authorization, wherein the security policy is a first security policy.

6. The method of claim 1, wherein the communication traffic is Transmission Control Protocol/Internet Protocol traffic.

7. The method of claim 4, wherein the segment network appliance is a second segment network appliance, and wherein the first network appliance is a first segment network appliance.

8. The method of claim 4, wherein the first network appliance is a perimeter network appliance.

9. The method of claim 5, wherein the first security policy corresponds to two or more segments of the multi-level, segmented network environment, and wherein the second security policy corresponds to only a single segment of the multi-level, segmented network environment.

10. The method of claim 5, the method further comprising:

determining, by the second network appliance, that the network element to be accessed is controlled by a third network appliance;

generating, by the second network appliance, a third ZTNA request, wherein the third ZTNA request includes: the communication traffic and the ZTNA tags; and communicating, by the second network appliance, the third ZTNA request to the third network appliance.

11. A system for performing zero trust network access control in a multi-level, segmented network environment, the system comprising:

a first network appliance controlling access to a set of network elements, wherein the first network appliance includes: a first processor and a first non-transitory computer readable medium that has stored therein instructions that when executed by the first processor cause the first processor to:

receive a first Zero Trust Network Access (ZTNA) request, wherein the first ZTNA request is received in-line with communication traffic, and wherein the first ZTNA request includes: a ZTNA certificate authenticating an endpoint device an endpoint device, and identification of a network element to be accessed;

receive ZTNA tags corresponding to the ZTNA certificate from an endpoint management system;

apply a security policy using the ZTNA tags to yield an authorization;

determine that the network element to be accessed is controlled by a second network appliance;

generate a second ZTNA request, wherein the second ZTNA request includes: the communication traffic and the ZTNA tags;

communicate the second ZTNA request to a second network appliance, wherein the second network appliance controls access to a subset of the set of network elements, wherein the authorization is a first authorization, wherein the security policy is a first security policy, and wherein the system further comprises:

the second network appliance, wherein the second network appliance includes: a second processor and a second non-transitory computer readable medium that has stored therein instructions that when executed by the second processor cause the second processor to apply a second security policy to the ZTNA tags to yield a second authorization, wherein the second security policy is different from the first security policy.

12. The system of claim 11, wherein the first security policy corresponds to two or more segments of the multi-level, segmented network environment, and wherein the second security policy corresponds to only a single segment of the multi-level, segmented network environment.

13. The system of claim 11, wherein the second non-transitory computer readable medium further has stored therein instructions that when executed by the second processor cause the second processor to:

determine that the network element to be accessed is controlled by a third network appliance;

generate a third ZTNA request, wherein the third ZTNA request includes: the communication traffic and the ZTNA tags; and communicate the third ZTNA request to the third network appliance.

14. The system of claim 11, wherein the second ZTNA request is encapsulated in a ZTNA access proxy tunnel.

15. The system of claim 11, wherein the second network appliance is a segment network appliance.

16. The system of claim 15, wherein the segment network appliance is a second segment network appliance, and wherein the first network appliance is a first segment network appliance.

17. The system of claim 15, wherein the first network appliance is a perimeter network appliance.

18. The system of claim 15, wherein the communication traffic is Transmission Control Protocol/Internet Protocol traffic.

19. A non-transitory computer readable medium having stored therein instructions that when executed by a processor cause the processor to:

receive a first Zero Trust Network Access (ZTNA) request, wherein the first ZTNA request is received in-line with communication traffic, and wherein the first ZTNA request includes a ZTNA certificate authenticating an endpoint device an endpoint device, and identification of a network element to be accessed;

receive ZTNA tags corresponding to the ZTNA certificate from an endpoint management system;

apply a security policy using the ZTNA tags to yield an authorization;

determine that the network element to be accessed is controlled by a second network appliance;

generate a second ZTNA request, wherein the second ZTNA request includes: the communication traffic and the ZTNA tags;

communicate the second ZTNA request to the second network appliance; and apply a second security policy to the ZTNA tags to yield a second authorization, wherein the second security policy is different from the security policy.

* * * * *